(12) United States Patent
Lin

(10) Patent No.: US 12,360,703 B2
(45) Date of Patent: Jul. 15, 2025

(54) DECODING METHOD BASED ON REPLACEMENT DATA WITH REDUCED DATA AMOUNT, MEMORY STORAGE DEVICE AND MEMORY CONTROL CIRCUIT UNIT

(71) Applicant: PHISON ELECTRONICS CORP., Miaoli (TW)

(72) Inventor: Yu-Hsiang Lin, Yunlin County (TW)

(73) Assignee: PHISON ELECTRONICS CORP., Miaoli (TW)

(*) Notice: Subject to any disclaimer, the term of this patent is extended or adjusted under 35 U.S.C. 154(b) by 0 days.

(21) Appl. No.: 18/402,671

(22) Filed: Jan. 2, 2024

(65) Prior Publication Data

US 2025/0181270 A1    Jun. 5, 2025

(30) Foreign Application Priority Data

Nov. 30, 2023   (TW) .................................. 112146543

(51) Int. Cl.
*G06F 3/06* (2006.01)

(52) U.S. Cl.
CPC .......... *G06F 3/0659* (2013.01); *G06F 3/0619* (2013.01); *G06F 3/0656* (2013.01); *G06F 3/0679* (2013.01)

(58) Field of Classification Search
CPC .... G06F 3/0659; G06F 3/0619; G06F 3/0679; G06F 3/0656
See application file for complete search history.

(56) References Cited

U.S. PATENT DOCUMENTS

| | | | | |
|---|---|---|---|---|
| 8,230,300 | B2 * | 7/2012 | Perlmutter | G06F 3/0604 |
| | | | | 714/763 |
| 11,456,758 | B1 * | 9/2022 | Zamir | H03M 7/3059 |
| 12,198,779 | B2 * | 1/2025 | Honma | G11C 7/1066 |
| 2022/0129163 | A1 * | 4/2022 | Sravan | G06F 3/061 |
| 2023/0034098 | A1 * | 2/2023 | Tishbi | G06F 21/79 |
| 2023/0170004 | A1 * | 6/2023 | Azuma | G11C 7/12 |
| | | | | 365/189.011 |

* cited by examiner

*Primary Examiner* — Mark A Giardino, Jr.
(74) *Attorney, Agent, or Firm* — JCIPRNET

(57) ABSTRACT

A memory control method, a memory storage device, and a memory control circuit unit are disclosed. The method includes: sending a plurality of read command sequences configured to instruct a rewritable non-volatile memory module to read a first physical unit by using a plurality of read voltage levels; after the read command sequences are sent, receiving first data from the rewritable non-volatile memory module, where the first data includes replacement data corresponding to a plurality of first bits reflecting a read result of a first memory cell by using the read voltage levels, and a data amount of the first data is less than a total data amount of the first bits; after the first data is received, performing data restoration on the first data to obtain a plurality of second bits; performing a decoding operation according to the second bits.

18 Claims, 10 Drawing Sheets

DECODING METHOD BASED ON REPLACEMENT DATA WITH REDUCED DATA AMOUNT, MEMORY STORAGE DEVICE AND MEMORY CONTROL CIRCUIT UNIT

CROSS-REFERENCE TO RELATED APPLICATION

This application claims the priority benefit of Taiwan application serial no. 112146543, filed on Nov. 30, 2023. The entirety of the above-mentioned patent application is hereby incorporated by reference herein and made a part of this specification.

BACKGROUND

Technical Field

The disclosure relates to a memory control technology, and more particularly to a memory control method, a memory storage device, and a memory control circuit unit.

Description of Related Art

In recent years, the market for portable electronic devices, such as mobile phones and notebook computers, has experienced significant growth. This surge in demand has been accompanied by an escalating need for storage media. Rewritable non-volatile memory modules, such as a flash memory, have emerged as good choices due to their non-volatile data storage, energy efficiency, compactness, and absence of mechanical components. These characteristics make the rewritable non-volatile memory modules a perfect fit for integration into various portable electronic devices, including those mentioned above.

As the data storage density of the rewritable non-volatile memory modules increases, the interference between memory cells in the rewritable non-volatile memory modules becomes more severe. This heightened interference raises the likelihood of errors occurring in the data read from the rewritable non-volatile memory modules. Generally, when a bit error rate (BER) of read data is high, a memory controller may attempt to enhance a decoding success rate of the data through a soft decoding mode. However, in this mode, the memory controller needs to read a significant amount of data (referred to as soft bits) from the rewritable non-volatile memory module to aid in decoding. This, in turn, consumes a substantial portion of the data transmission bandwidth of the rewritable non-volatile memory module, thereby diminishing decoding efficiency. In addition, the soft bits occupy a considerable cache space after the soft bits are read into the memory controller, leading to a wasteful utilization of system resources.

SUMMARY

The disclosure provides a memory control method, a memory storage device, and a memory control circuit unit for resolving the above-mentioned issues.

An exemplary embodiment of the disclosure provides a memory control method for a rewritable non-volatile memory module. The rewritable non-volatile memory module includes a plurality of physical units, and the memory control method includes following steps. A plurality of read command sequences are sent, where the read command sequences are configured to instruct the rewritable non-volatile memory module to read a first physical unit of the physical units by using a plurality of read voltage levels, and the first physical unit includes a plurality of memory cells. After sending the read command sequences, first data is received from the rewritable non-volatile memory module, where the first data includes replacement data corresponding to a plurality of first bits, the first bits reflect a read result of a first memory cell of the memory cells, the read result is obtained by using the read voltage levels by the rewritable non-volatile memory module, and a data amount of the first data is less than a total data amount of the first bits. After receiving the first data from the rewritable non-volatile memory module, data restoration is performed on the first data to obtain a plurality of second bits. A decoding operation is performed based on the second bits.

Another exemplary embodiment of the disclosure provides a memory storage device that includes a connection interface unit, a rewritable non-volatile memory module, and a memory control circuit unit. The connection interface unit is configured to be coupled to a host system. The memory control circuit unit is coupled to the connection interface unit and the rewritable non-volatile memory module. The rewritable non-volatile memory module includes a plurality of physical units. The memory control circuit unit is configured to: send a plurality of read command sequences, where the read command sequences are configured to instruct the rewritable non-volatile memory module to read a first physical unit of the physical units by using a plurality of read voltage levels, and the first physical unit includes a plurality of memory cells; after sending the read command sequences, receive first data from the rewritable non-volatile memory module, where the first data includes replacement data corresponding to a plurality of first bits, the first bits reflect a read result of a first memory cell of the memory cells, the read result is obtained by using the read voltage levels by the rewritable non-volatile memory module, and a data amount of the first data is less than a total data amount of the first bits; after receiving the first data from the rewritable non-volatile memory module, perform data restoration on the first data to obtain a plurality of second bits; perform a decoding operation based on the second bits.

Another exemplary embodiment of the disclosure provides a memory control circuit unit configured to control a rewritable non-volatile memory module, where the rewritable non-volatile memory module includes a plurality of physical units. The memory control circuit unit includes a host interface, a memory interface, a decoding circuit, and a memory management circuit. The host interface is configured to be coupled to a host system. The memory interface is configured to be coupled to the rewritable non-volatile memory module. The memory management circuit is coupled to the host interface, the memory interface, and the decoding circuit. The memory management circuit is configured to: send a plurality of read command sequences, where the read command sequences are configured to instruct the rewritable non-volatile memory module to read a first physical unit of the physical units by using a plurality of read voltage levels, and the first physical unit includes a plurality of memory cells; after sending the read command sequences, receive first data from the rewritable non-volatile memory module, wherein the first data includes replacement data corresponding to a plurality of first bits, the first bits reflect a read result of a first memory cell of the memory cells, the read result is obtained by using the read voltage levels by the rewritable non-volatile memory module, and a data amount of the first data is less than a total data amount of the first bits; after receiving the first data from the rewritable non-volatile memory module, perform data restoration on the first data to obtain a plurality of second bits. The decoding circuit is configured to perform a decoding operation based on the second bits.

Another exemplary embodiment of the disclosure provides a memory control method for a rewritable non-volatile memory module. The rewritable non-volatile memory module includes a plurality of physical units, and the memory control method includes following steps. A plurality of read command sequences are sent, where the read command sequences are configured to instruct the rewritable non-volatile memory module to read a first physical unit of the physical units by using a plurality of read voltage levels, and the first physical unit includes a plurality of memory cells. After sending the read command sequences, a plurality of first bits are received from the rewritable non-volatile memory module, where the first bits reflect a read result of a first memory cell of the memory cells, and the read result is obtained by using the read voltage levels by the rewritable non-volatile memory module. After receiving the first bits from the rewritable non-volatile memory module, first data is stored in a buffer memory, where the first data includes replacement data corresponding to the first bits, and a data amount of the first data is less than a total data amount of the first bits. The first data is read from the buffer memory, and data restoration is performed on the first data to obtain a plurality of second bits. A decoding operation is performed based on the second bits.

Another exemplary embodiment of the disclosure provides a memory storage device that includes a connection interface unit, a rewritable non-volatile memory module, and a memory control circuit unit. The connection interface unit is configured to be coupled to a host system. The memory control circuit unit is coupled to the connection interface unit and the rewritable non-volatile memory module. The rewritable non-volatile memory module includes a plurality of physical units. The memory control circuit unit is configured to: send a plurality of read command sequences, where the read command sequences are configured to instruct the rewritable non-volatile memory module to read a first physical unit of the physical units by using a plurality of read voltage levels, and the first physical unit includes a plurality of memory cells; after sending the read command sequences, receive a plurality of first bits from the rewritable non-volatile memory module, where the first bits reflect a read result of a first memory cell of the memory cells, and the read result is obtained by using the read voltage levels by the rewritable non-volatile memory module. After receiving the first bits from the rewritable non-volatile memory module, store first data in a buffer memory, where the first data includes replacement data corresponding to the first bits, and a data amount of the first data is less than a total data amount of the first bits; read the first data from the buffer memory and perform data restoration on the first data to obtain a plurality of second bits; perform a decoding operation based on the second bits.

Another exemplary embodiment of the disclosure provides a memory control circuit unit configured to control a rewritable non-volatile memory module, where the rewritable non-volatile memory module includes a plurality of physical units. The memory control circuit unit includes a host interface, a memory interface, a buffer memory, a decoding circuit, and a memory management circuit. The host interface is configured to be coupled to a host system. The memory interface is configured to be coupled to the rewritable non-volatile memory module. The memory management circuit is coupled to the host interface, the memory interface, the buffer memory, and the decoding circuit. The memory management circuit is configured to: send a plurality of read command sequences, where the read command sequences are configured to instruct the rewritable non-volatile memory module to read a first physical unit of the physical units by using a plurality of read voltage levels, and the first physical unit includes a plurality of memory cells; after sending the read command sequences, receive a plurality of first bits from the rewritable non-volatile memory module, where the first bits reflect a read result of a first memory cell of the memory cells, and the read result is obtained by using the read voltage levels by the rewritable non-volatile memory module; after receiving the first bits from the rewritable non-volatile memory module, store first data in the buffer memory, where the first data includes replacement data corresponding to the first bits, and a data amount of the first data is less than a total data amount of the first bits; read the first data from the buffer memory and perform data restoration on the first data to obtain a plurality of second bits, where the decoding circuit is configured to perform a decoding operation based on the second bits.

In light of the above, the memory control method, the memory storage device, and the memory control circuit unit provided in one or more exemplary embodiments of the disclosure are applicable to reduce the data amount of soft bits to be transmitted or stored in a soft decoding mode. Thereby, decoding performance of the soft decoding mode is improved.

DETAILED DESCRIPTION OF DISCLOSED EMBODIMENTS

Generally, a memory storage device (also referred to as a memory storage system) includes a rewritable non-volatile memory module and a controller (also referred to as a control circuit). The memory storage device may be used together with a host system, so that the host system may write data to the memory storage device or read data from the memory storage device.

Figure 1:
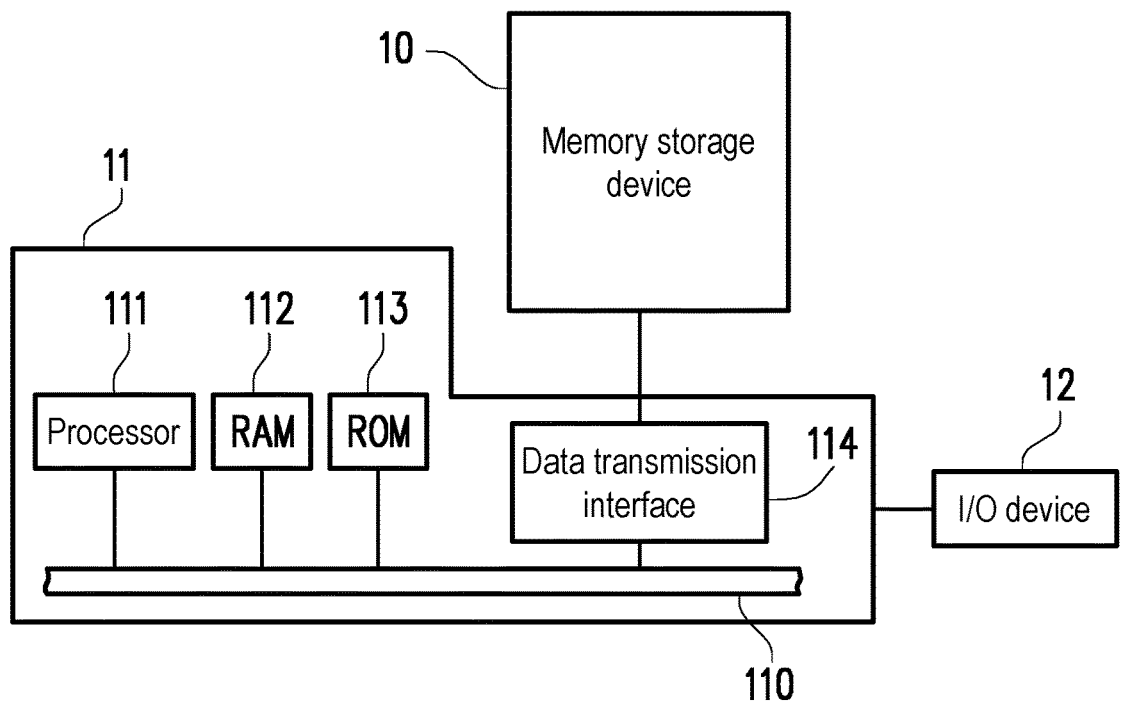
FIG. 1 is a schematic diagram of a host system, a memory storage device, and an input/output (I/O) device according to an exemplary embodiment of the disclosure.
Figure 2:
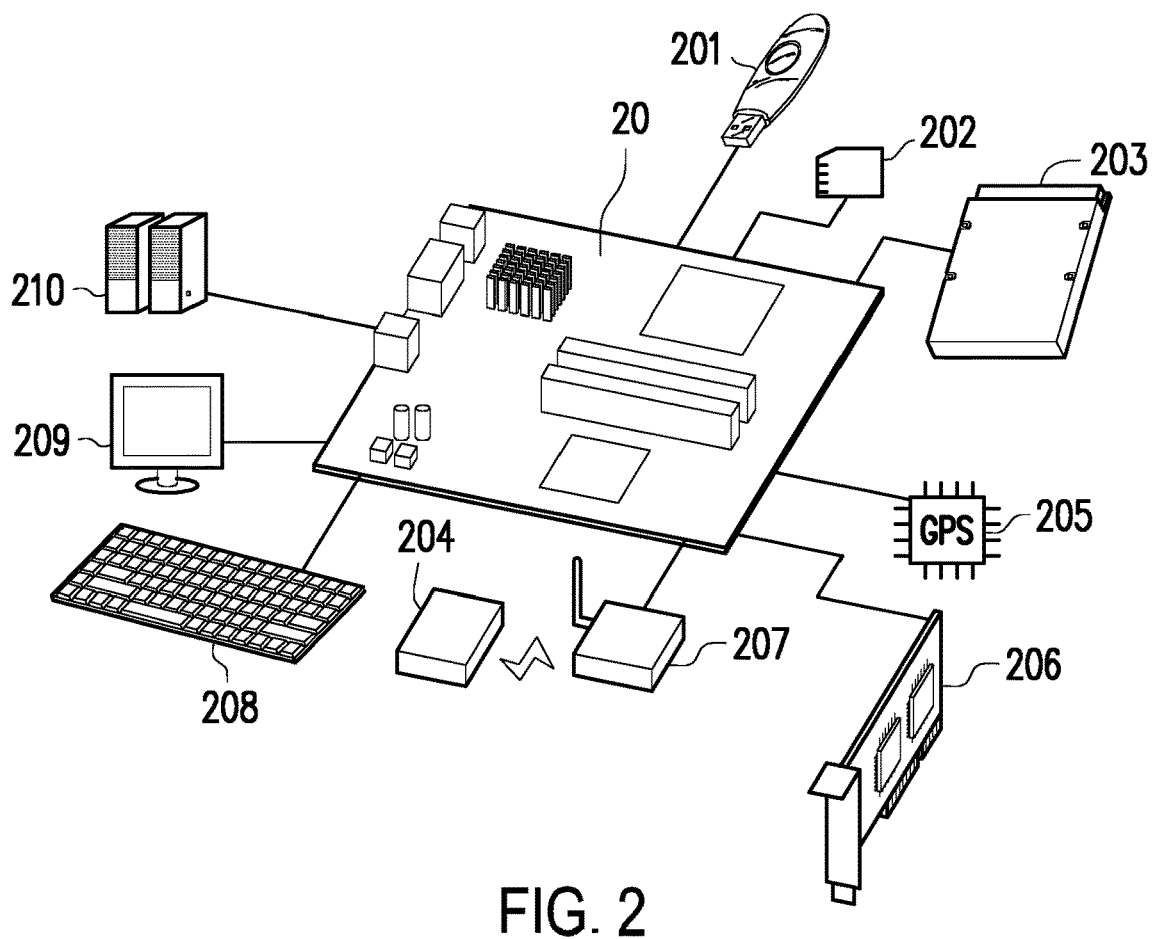
FIG. 2 is a schematic diagram of a host system, a memory storage device, and an I/O device according to an exemplary embodiment of the disclosure.

FIG. 1 is a schematic diagram of a host system, a memory storage device, and an input/output (I/O) device according to an exemplary embodiment of the disclosure. FIG. 2 is a schematic diagram of a host system, a memory storage device, and an I/O device according to an exemplary embodiment of the disclosure.

Please refer to FIG. 1 and FIG. 2. A host system 11 may include a processor 111, a random access memory (RAM) 112, a read only memory (ROM) 113, and a data transmission interface 114. The processor 111, the random access memory 112, the read only memory 113, and the data transmission interface 114 may be coupled to a system bus 110.

In an exemplary embodiment, the host system 11 may be coupled to the memory storage device 10 through the data transmission interface 114. For instance, the host system 11 may store data into the memory storage device 10 or read data from the memory storage device 10 via the data transmission interface 114. In addition, the host system 11 may be coupled to the I/O device 12 through the system bus 110. For instance, the host system 11 may send an output signal to the I/O device 12 or receive an input signal from the I/O device 12 via the system bus 110.

In an exemplary embodiment, the processor 111, the random access memory 112, the read only memory 113, and the data transmission interface 114 may be disposed on a motherboard 20 of the host system 11. The number of the data transmission interface 114 may be one or more. Through the data transmission interface 114, the motherboard 20 may be coupled to the memory storage device 10 via a wired or wireless manner.

In an exemplary embodiment, the memory storage device 10 may be, For instance, a flash drive 201, a memory card 202, a solid state drive (SSD) 203, or a wireless memory storage device 204. The wireless memory storage device 204 may be, For instance, a near field communication (NFC) memory storage device, a Wi-Fi memory storage device, a Bluetooth memory storage device, a low-power Bluetooth memory storage device (For instance, iBeacon), or other memory storage devices based on various wireless communication technologies. In addition, the motherboard 20 may also be coupled to a global positioning system (GPS) module 205, a network interface card 206, a wireless transmission device 207, a keyboard 208, a screen 209, a speaker 210, or various other I/O devices through the system bus 110. For instance, in an exemplary embodiment, the motherboard 20 may access the wireless memory storage device 204 through the wireless transmission device 207.

In an exemplary embodiment, the host system 11 is a computer system. In an exemplary embodiment, the host system 11 may be any system that may substantially cooperate with a memory storage device to store data. In an exemplary embodiment, the memory storage device 10 and the host system 11 may respectively include a memory storage device 30 and a host system 31 of FIG. 3.

Figure 3:
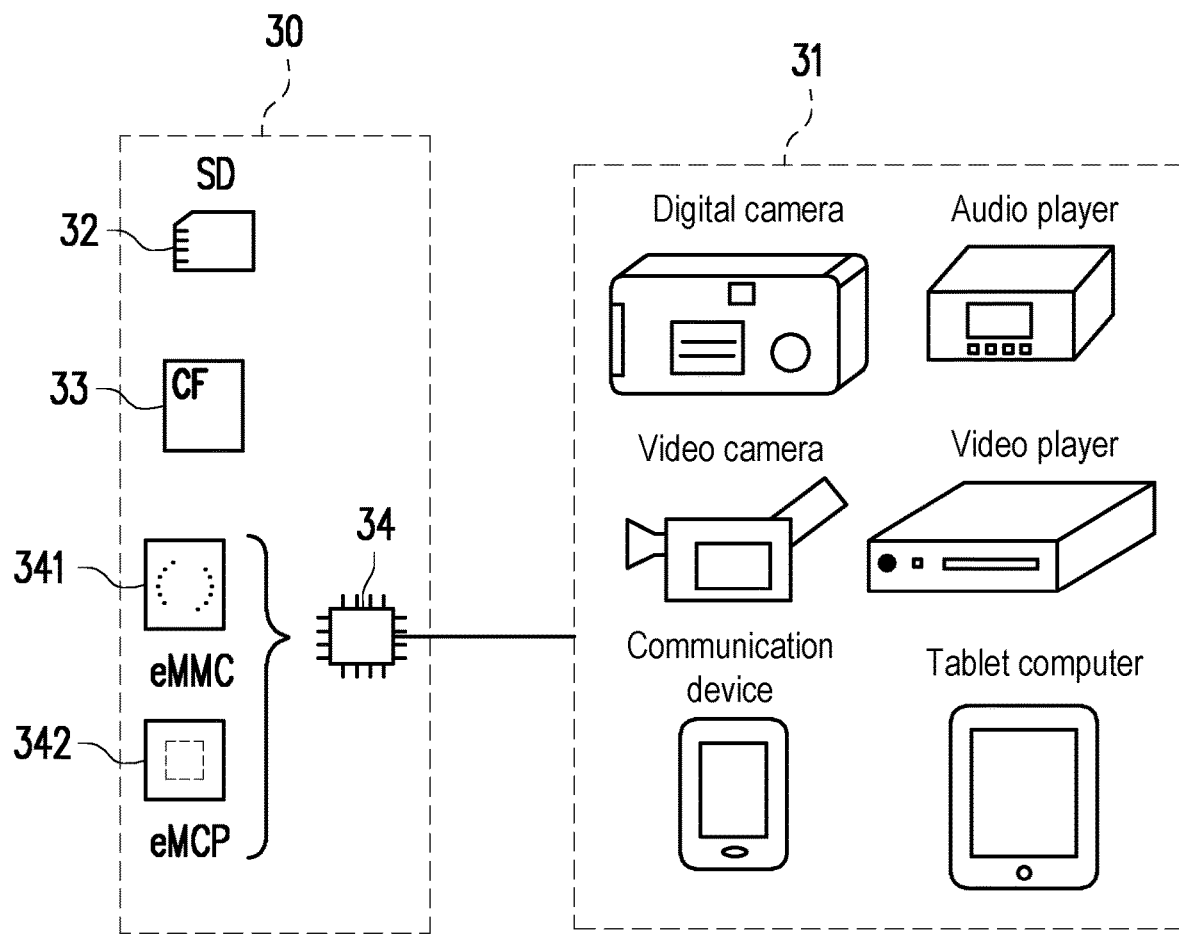
FIG. 3 is a schematic diagram of a host system and a memory storage device according to an exemplary embodiment of the disclosure.

FIG. 3 is a schematic diagram of a host system and a memory storage device according to an exemplary embodiment of the disclosure.

Please refer to FIG. 3. The memory storage device 30 may be used in conjunction with the host system 31 to store data. For instance, the host system 31 may be a digital camera, a video camera, a communication device, an audio player, a video player, a tablet computer, or other systems. For instance, the memory storage device 30 may be a secure digital (SD) card 32, a compact flash (CF) card 33, an embedded storage device 34, or various other non-volatile memory storage devices used by the host system 31. The embedded storage device 34 includes an embedded multimedia card (eMMC) 341, an embedded multi-chip package (eMCP) storage device 342, and/or various other embedded storage devices in which a memory module is directly coupled onto a substrate of a host system.

Figure 4:
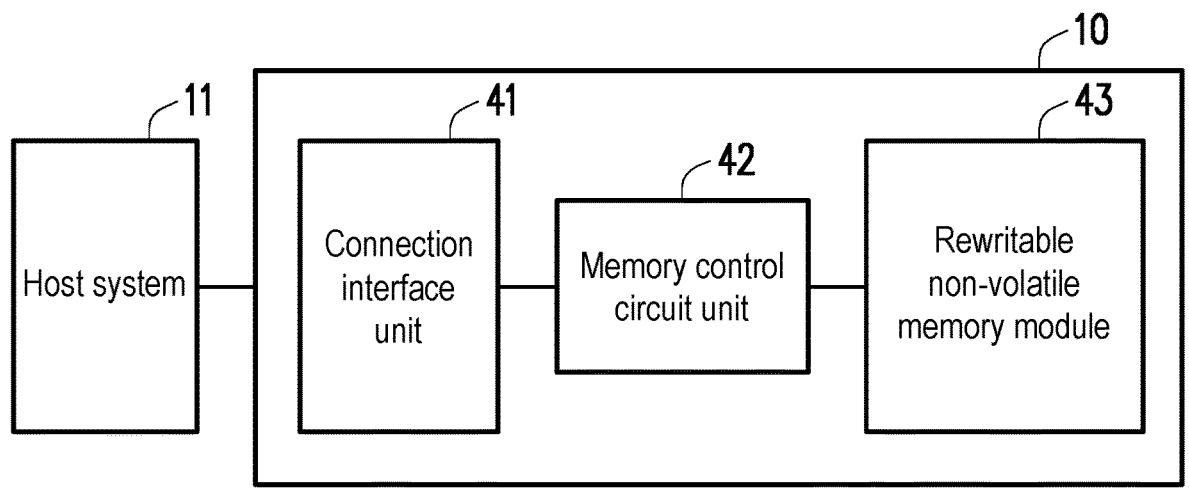
FIG. 4 is a schematic diagram of a memory storage device according to an exemplary embodiment of the disclosure.

FIG. 4 is a schematic diagram of a memory storage device according to an exemplary embodiment of the disclosure. Please refer to FIG. 4. The memory storage device 10 includes a connection interface unit 41, a memory control circuit unit 42, and a rewritable non-volatile memory module 43.

The connection interface unit 41 is configured to be coupled to the host system 11. The memory storage device 10 may communicate with the host system 11 via the connection interface unit 41. In an exemplary embodiment, the connection interface unit 41 is compatible with the peripheral component interconnect express (PCI express) standard. In an exemplary embodiment, the connection interface unit 41 may also conform to the serial advanced technology attachment (SATA) standard, the parallel advanced technology attachment (PATA) standard, the Institute of Electrical and Electronic Engineers (IEEE) 1394 standard, the universal serial bus (USB) standard, the SD interface standard, the ultra high speed-I (UHS-I) interface standard, the ultra high speed-II (UHS-II) interface standard, the memory stick (MS) interface standard, the MCP interface standard, the MMC interface standard, the eMMC interface standard, the universal flash storage (UFS) interface standard, the eMCP interface standard, the CF interface standard, the integrated device electronics (IDE) standard, or other suitable standards. The connection interface unit 41 and the memory control circuit unit 42 may be packaged in one chip, or the connection interface unit 41 may be arranged outside a chip containing the memory control circuit unit 42.

The memory control circuit unit 42 is coupled to the connection interface unit 41 and the rewritable non-volatile memory module 43. The memory control circuit unit 42 is configured to perform multiple logic gates or control commands implemented in the form of hardware or the form of firmware and perform operations such as data writing, reading, and erasing in the rewritable non-volatile memory module 43 according to a command of the host system 11.

The rewritable non-volatile memory module 43 is configured to store data written by the host system 11. The rewritable non-volatile memory module 43 may include a single level cell (SLC) NAND flash memory module (that is, a flash memory module that may store 1 bit in a memory cell), a multi level cell (MLC) NAND flash memory module (that is, a flash memory module that may store 2 bits in a memory cell), a triple level cell (TLC) NAND flash memory module (that is, a flash memory module that may store 3 bits in a memory cell), a quad level cell (QLC) NAND flash memory module (that is, a flash memory module that may store 4 bits in a memory cell), other flash memory modules, or other memory modules with the same characteristics.

Each memory cell in the rewritable non-volatile memory module 43 stores one or more bits with changes in voltage (hereinafter also referred to as a threshold voltage). Specifically, there is a charge trapping layer between a control gate and a channel of each memory cell. Through applying a write voltage to the control gate, the number of electrons in the charge trapping layer may be changed, thereby changing the threshold voltage of the memory cell. The operation of changing the threshold voltage of the memory cell is also referred to as "writing data to the memory cell" or "programming the memory cell". As the threshold voltage changes, each memory cell in the rewritable non-volatile memory module 43 has multiple storage statuses. Through applying a read voltage, it is possible to judge which storage status a memory cell belongs to, thereby obtaining one or more bits stored in the memory cell.

In an exemplary embodiment, the memory cells of the rewritable non-volatile memory module 43 may constitute multiple physical programming units, and the physical programming units may constitute multiple physical erasing units. Specifically, the memory cells on the same word line may form one or more physical programming units. If each memory cell may store more than 2 bits, the physical programming units on the same word line may be at least classified into a lower physical programming unit and an upper physical programming unit. For instance, a least significant bit (LSB) of a memory cell belongs to the lower physical programming unit, and a most significant bit (MSB) of a memory cell belongs to the upper physical programming unit. Generally, in the MLC NAND flash memory, the write speed of the lower physical programming unit is greater than the write speed of the upper physical programming unit and/or the reliability of the lower physical programming unit is higher than the reliability of the upper physical programming unit.

In an exemplary embodiment, the physical programming unit is the smallest unit of programming. That is, the physical programming unit is the smallest unit of writing data. For instance, the physical programming unit may be a physical page or a physical sector. If the physical programming unit is a physical page, the physical programming units may include a data bit area and a redundancy bit area. The data bit area contains multiple physical sectors for storing user data, and the redundancy bit area is configured to store system data (For instance, management data such as an error correcting code). In an exemplary embodiment, the data bit area contains 32 physical sectors, and the size of one physical sector is 512 bytes (B). However, in other exemplary embodiments, the data bit area may also contain 8, 16, more, or less physical sectors, and the size of each physical sector may also be greater or smaller. On the other hand, the physical erasing unit is the smallest unit of erasure. That is, each physical erasing unit contains the smallest number of memory cells to be erased together. For instance, the physical erasing unit is a physical block.

Figure 5:
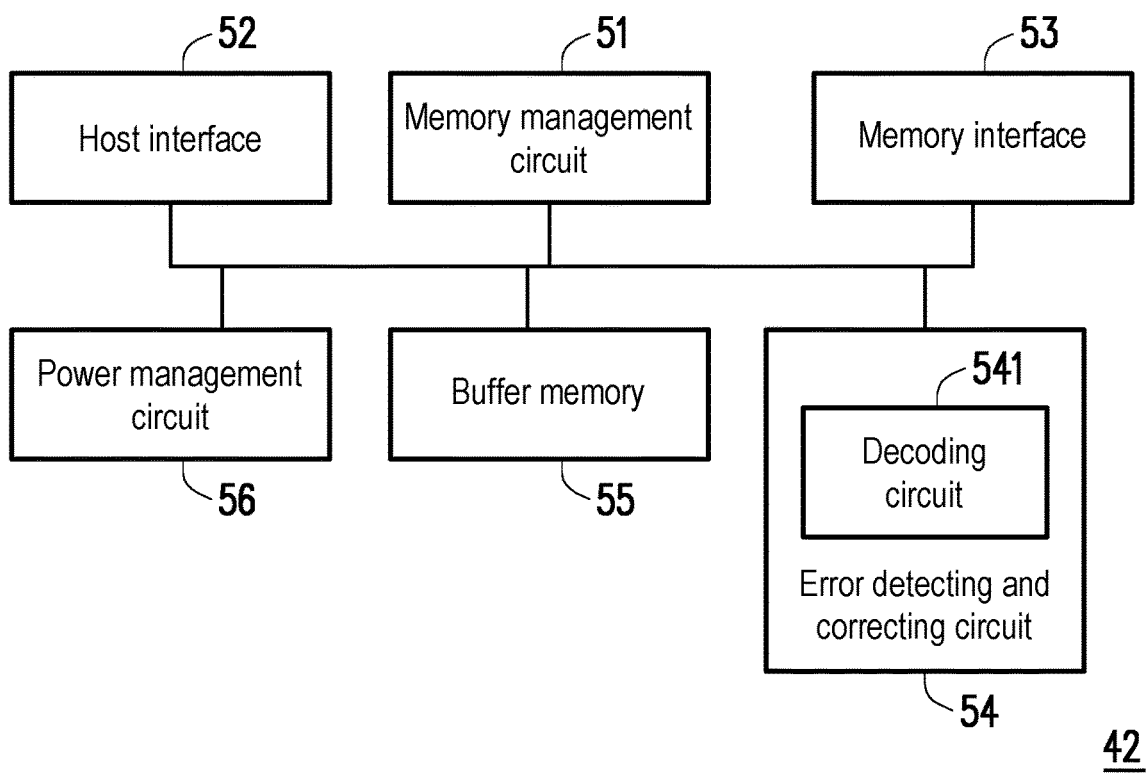
FIG. 5 is a schematic diagram of a memory control circuit unit according to an exemplary embodiment of the disclosure.

FIG. 5 is a schematic diagram of a memory control circuit unit according to an exemplary embodiment of the disclosure. Please refer to FIG. 5. The memory control circuit unit 42 includes a memory management circuit 51, a host interface 52, and a memory interface 53.

The memory management circuit 51 is configured to control the overall operation of the memory control circuit unit 42. Specifically, the memory management circuit 51 has multiple control commands, and when the memory storage device 10 is operating, the control commands are performed to perform operations such as data writing, reading, and erasing. The following description of the operation of the memory management circuit 51 is equivalent to the description of the operation of the memory control circuit unit 42 and the memory storage device 10.

In an exemplary embodiment, the control commands of the memory management circuit 51 are implemented in the form of firmware. For instance, the memory management circuit 51 has a microprocessor unit (not shown) and a read only memory (not shown), and the control commands are burnt into the read only memory. When the memory storage device 10 is operating, the control commands are performed by the microprocessor unit to perform operations such as data writing, reading, and erasing.

In an exemplary embodiment, the control commands of the memory management circuit 51 may also be stored into a specific region (For instance, a system area dedicated to storing system data in a memory module) of the rewritable non-volatile memory module 43 in the form of program codes. In addition, the memory management circuit 51 has a microprocessor unit (not shown), a read only memory (not shown), and a random access memory (not shown). In particular, the read only memory has a boot code, and when the memory control circuit unit 42 is enabled, the microprocessor unit first performs the boot code to load the control commands stored in the rewritable non-volatile memory module 43 into the random access memory of the memory management circuit 51. After that, the microprocessor unit runs the control commands to perform operations such as data writing, reading, and erasing.

In an exemplary embodiment, the control commands of the memory management circuit 51 may also be implemented in the form of hardware. For instance, the memory management circuit 51 includes a microcontroller, a memory cell management circuit, a memory write circuit, a memory read circuit, a memory erase circuit, and a data processing circuit. The memory cell management circuit, the memory write circuit, the memory read circuit, the memory erase circuit, and the data processing circuit are coupled to the microcontroller. The memory cell management circuit is configured to manage a memory cell or a memory cell group of the rewritable non-volatile memory module 43. The memory write circuit is configured to issue a write command sequence to the rewritable non-volatile memory module 43 to write data to the rewritable non-volatile memory module 43. The memory read circuit is configured to issue a read command sequence to the rewritable non-volatile memory module 43 to read data from the rewritable non-volatile memory module 43. The memory erase circuit is configured to issue an erase command sequence to the rewritable non-volatile memory module 43 to erase data from the rewritable non-volatile memory module 43. The data processing circuit is configured to process data to be written to the rewritable non-volatile memory module 43 and data read from the rewritable non-volatile memory module 43. The write command sequence, the read command sequence, and the erase command sequence may each include one or more program codes or command codes and are configured to instruct the rewritable non-volatile memory module 43 to perform corresponding operations such as writing, reading, and erasing. In an exemplary embodiment, the memory management circuit 51 may also issue other types of command sequences to the rewritable non-volatile memory module 43 to instruct to perform corresponding operations.

The host interface 52 is coupled to the memory management circuit 51. The memory management circuit 51 may communicate with the host system 11 through the host interface 52. The host interface 52 may be configured to receive and identify commands and data sent by the host system 11. For instance, the commands and the data sent by the host system 11 may be sent to the memory management circuit 51 through the host interface 52. In addition, the memory management circuit 51 may send the data to the host system 11 through the host interface 52. In the exemplary embodiment, the host interface 52 is compatible with the PCI express standard. However, it must be understood that the disclosure is not limited thereto. The host interface 52 may also be compatible with the SATA standard, the PATA standard, the IEEE 1394 standard, the USB standard, the SD standard, the UHS-I standard, the UHS-II standard, the MS standard, the MMC standard, the eMMC standard, the UFS standard, the CF standard, the IDE standard, or other suitable data transmission standards.

The memory interface 53 is coupled to the memory management circuit 51 and is configured to access the rewritable non-volatile memory module 43. For instance, the memory management circuit 51 may access the rewritable non-volatile memory module 43 through the memory interface 53. In other words, data to be written to the rewritable non-volatile memory module 43 is converted into a format acceptable by the rewritable non-volatile memory module 43 via the memory interface 53. Specifically, if the memory management circuit 51 intends to access the rewritable non-volatile memory module 43, the memory interface 53 will send the corresponding command sequence. For instance, the command sequences may include the write command sequence instructing to write data, the read command sequence instructing to read data, the erase command sequence instructing to erase data, and corresponding command sequences instructing various memory operations, e.g., changing a read voltage level, performing a garbage collection (GC) operation, and so on. The command sequences are, for instance, generated by the memory management circuit 51 and sent to the rewritable non-volatile memory module 43 through the memory interface 53. The command sequences may include one or more signals, or data on a bus. The signals or the data may include command codes or program codes. For instance, the read command sequence includes information such as a read recognition code and a memory address.

In an exemplary embodiment, the memory control circuit unit 42 further includes an error detecting and correcting (EDAC) circuit 54, a buffer memory 55, and a power management circuit 56.

The error detecting and correcting circuit 54 is coupled to the memory management circuit 51 and is configured to perform error detecting and correcting operations to ensure correctness of data. Specifically, when the memory management circuit 51 receives a write command from the host system 11, the error detecting and correcting circuit 54 generates a corresponding error correcting code (ECC) and/or error detecting code (EDC) for data corresponding to the write command, and the memory management circuit 51 writes the data corresponding to the write command and the corresponding error correcting code and/or error detecting code to the rewritable non-volatile memory module 43. Later, when the memory management circuit 51 reads the data from the rewritable non-volatile memory module 43, the error correcting code and/or the error detecting code corresponding to the data are read at the same time, and the error detecting and correcting circuit 54 will perform error detecting and correcting operations on the read data according to the error correcting code and/or the error detecting code.

In an exemplary embodiment, the error detecting and correcting circuit 54 includes a decoding circuit 541. The decoding circuit 541 may be configured to perform a decoding operation on data to correct errors in the data. For instance, the decoding circuit 541 may perform the decoding operation by applying a low density parity check code (LDPC code) or other types of encoding/decoding algorithms.

The buffer memory 55 is coupled to the memory management circuit 51 and is configured to temporarily store data. The power management circuit 56 is coupled to the memory management circuit 51 and is configured to control the power of the memory storage device 10.

In an exemplary embodiment, the rewritable non-volatile memory module 43 of FIG. 4 may include a flash memory module. In an exemplary embodiment, the memory control circuit unit 42 of FIG. 4 may include a flash memory controller. In an exemplary embodiment, the memory management circuit 51 of FIG. 5 may include a flash memory management circuit.

Figure 6:
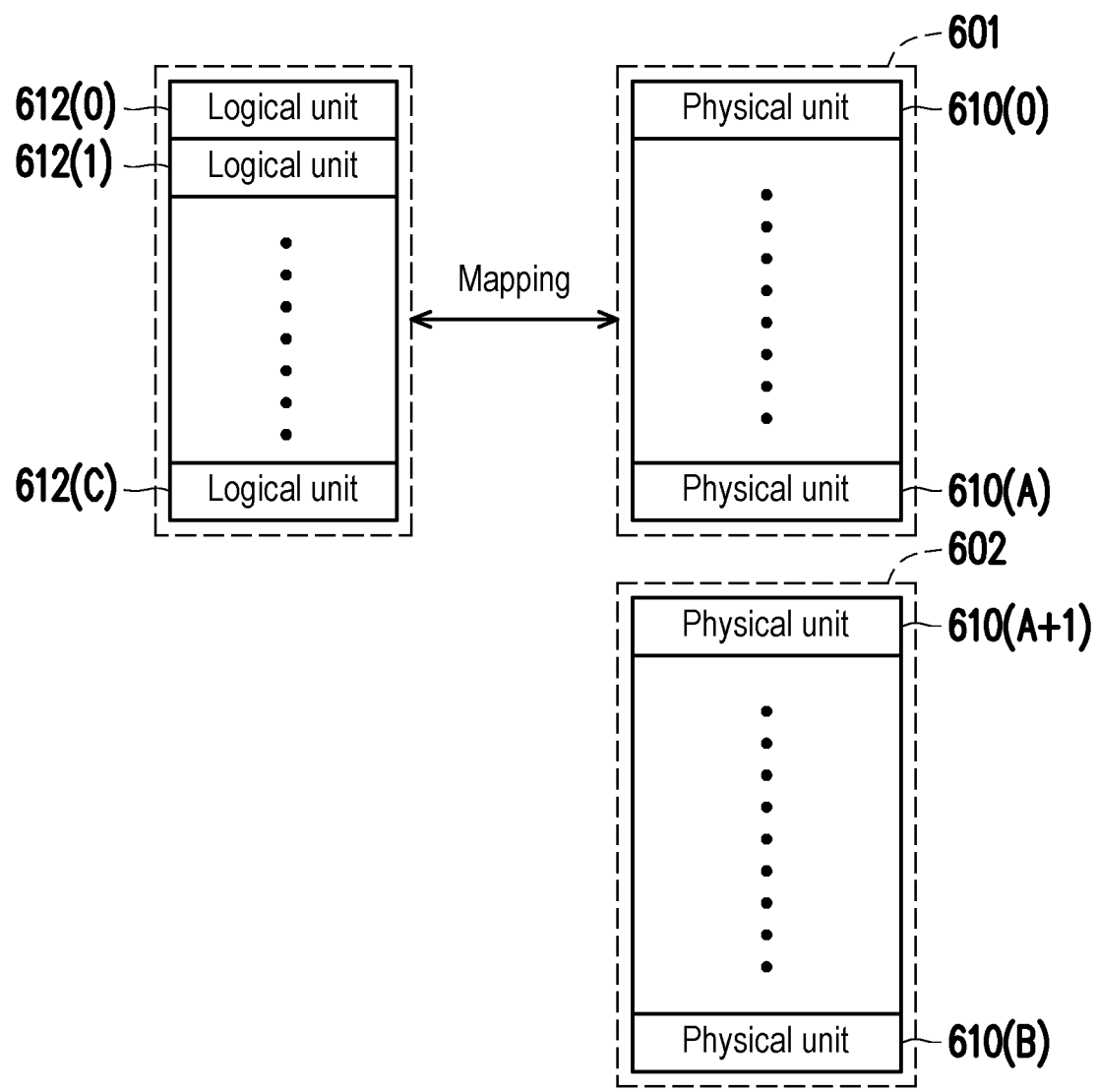
FIG. 6 is a schematic diagram of managing a rewritable non-volatile memory module according to an exemplary embodiment of the disclosure.

FIG. 6 is a schematic diagram of managing a rewritable non-volatile memory module according to an exemplary embodiment of the disclosure. Please refer to FIG. 6. The memory management circuit 51 may logically group physical units 610(0) to 610(B) in the rewritable non-volatile memory module 43 into a storage area 601 and a spare area 602.

In an exemplary embodiment, one physical unit refers to one physical address or one physical programming unit. In an exemplary embodiment, one physical unit may also refer to a combination of a plurality of continuous or discontinuous physical addresses. In an exemplary embodiment, one physical unit may also refer to a virtual block (VB), and the VB may include a plurality of physical addresses or a plurality of physical programming units. In an exemplary embodiment of the disclosure, one VB may include one or more physical erasing units.

In an exemplary embodiment, the physical units 610(0) to 610(A) in the storage area 601 are configured to store user data (For instance, the user data from the host system 11 of FIG. 1). For instance, the physical units 610(0) to 610(A) in the storage area 601 may store valid data and invalid data. The physical units 610(A+1) to 610(B) in the spare area 602 do not store data (For instance, valid data). For instance, if a certain physical unit does not store valid data, the physical unit may be associated (or added) to the spare area 602. In addition, the physical units (or physical units that do not store valid data) in the spare area 602 may be erased. When writing new data, one or more physical units may be extracted from the spare area 602 to store the new data. In an exemplary embodiment, the spare area 602 is also referred to as a free pool.

In an exemplary embodiment, the memory management circuit 51 may be configured with logical units 612(0) to 612(C) to map the physical units 610(0) to 610(A) in the storage area 601. In an exemplary embodiment, each logical unit corresponds to one logical address. For instance, one logical address may include one or more logical block addresses (LBA) or other logical management units. In an exemplary embodiment, one logical unit may also correspond to one logical programming unit or consist of multiple continuous or non-continuous logical addresses.

It should be noted that one logical unit may be mapped to one or more physical units. If a certain physical unit is currently mapped by a certain logical unit, it means that data currently stored in the physical unit includes valid data. Conversely, if a certain physical unit is not currently mapped by any logical unit, it means that data currently stored in the physical unit is invalid data.

In an exemplary embodiment, the memory management circuit 51 may record management data (also referred to as logical-to-physical mapping information) describing a mapping relationship between the logical unit and the physical unit in at least one logical-to-physical mapping table. When the host system 11 intends to read data from the memory storage device 10 or write data to the memory storage device 10, the memory management circuit 51 may access the rewritable non-volatile memory module 43 according to information in the logical-to-physical mapping table.

In an exemplary embodiment, after reading data from a physical unit (also referred to as the first physical unit) in the rewritable non-volatile memory module 43, the decoding circuit 541 may perform a decoding operation on the data to correct errors in the data. Generally, if a bit error rate (BER) of the data read from the first physical unit is not high, the memory management circuit 51 and the decoding circuit 541 may decode the data based on a hard decoding mode to attempt to quickly correct a small number of errors in the data. However, if the BER of the data read from the first physical unit is higher, then the memory management circuit 51 and the decoding circuit 541 may select to decode the data based on a soft decoding mode to attempt to increase the decoding success rate of the data (i.e., increase the probability of successfully correcting all errors in the data).

Note that in the hard decoding mode, the memory management circuit 51 should read the hard bits corresponding to each memory cell from the first physical unit, and the decoding circuit 541 may perform decoding operations based on the hard bits. However, in the soft decoding mode, the memory management circuit 51 should simultaneously read one hard bit and multiple soft bits corresponding to one single memory cell from the first physical unit, and then the decoding circuit 541 may use the soft bits to aid in determining whether the hard bit is an error bit. Therefore, compared to the hard decoding mode, in the soft decoding mode, the memory management circuit 51 needs to read more data (i.e., the soft bits) from the rewritable non-volatile memory module 43 to aid in decoding, which consumes a substantial portion of the data transmission bandwidth of the rewritable non-volatile memory module 43, thereby diminishing decoding efficiency. In addition, the soft bits occupy a considerable cache space in the buffer memory 55 after the soft bits are read, leading to a wasteful utilization of system resources. In the following exemplary embodiments, by reducing the data amount of the soft bits transmitted or temporarily stored in the soft decoding mode, these issues may be effectively resolved.

Figure 7:
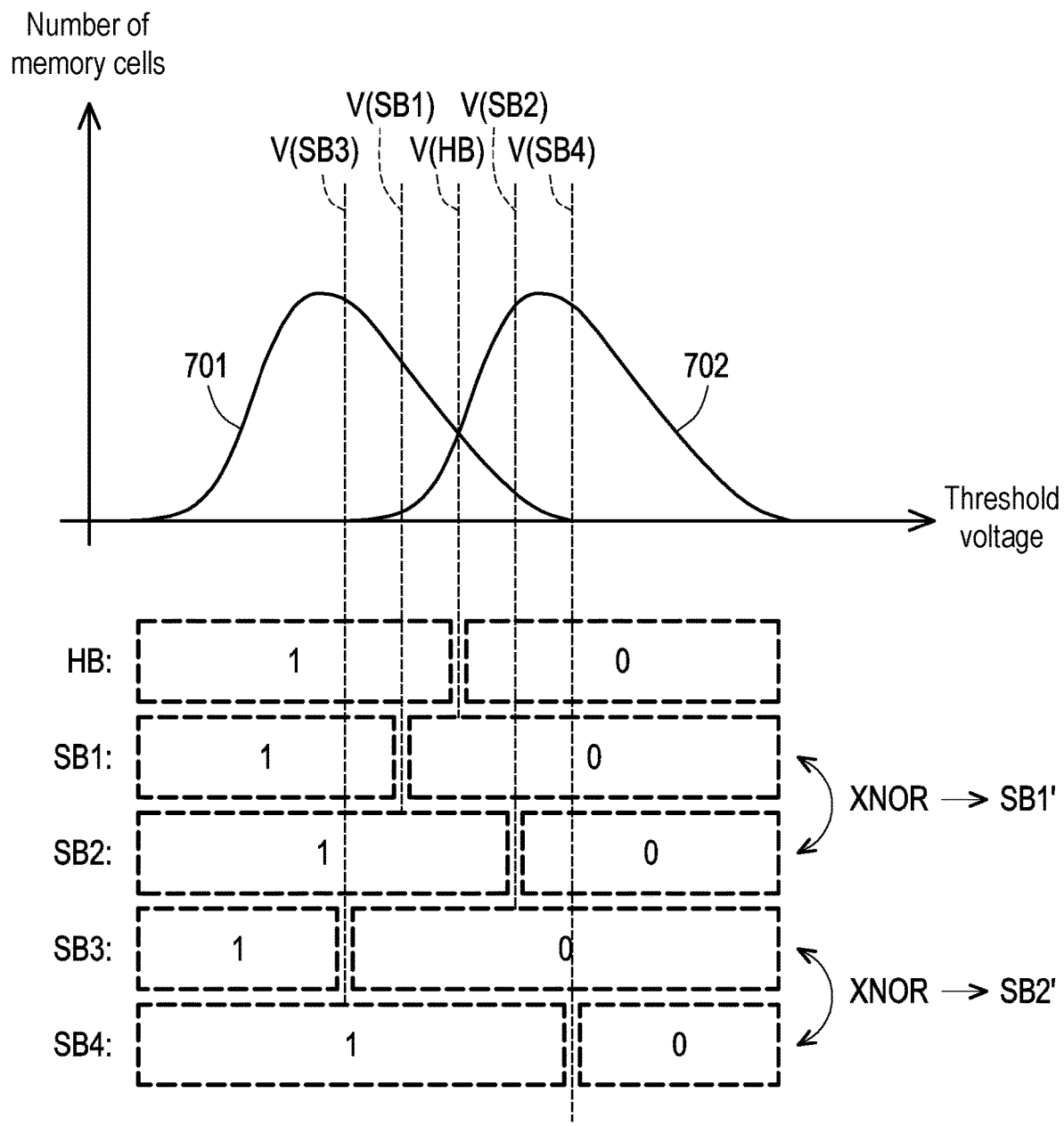
FIG. 7 is a schematic diagram illustrating a threshold voltage distribution of a first physical unit and the use of a plurality of read voltage levels to read the first physical unit according to an exemplary embodiment of the disclosure.

FIG. 7 is a schematic diagram illustrating a threshold voltage distribution of a first physical unit and the use of a plurality of read voltage levels to read the first physical unit according to an exemplary embodiment of the disclosure. With reference to FIG. 7, it is assumed that the first physical unit includes a plurality of memory cells, and the threshold voltage distribution states of the memory cells includes states 701 and 702. For instance, the state 701 corresponds to the bit "1", while the state 702 corresponds to the bit "0". That is, if the threshold voltage of a memory cell is in the state 701, it indicates that the memory cell is configured to store the bit "1". If the threshold voltage of a memory cell is in the state 702, it indicates that the memory cell is configured to store the bit "0". Note that the states 701 and 702 may also correspond to other bits or combinations of bits, which should however not be construed as a limitation in the disclosure.

As the usage or wear level of the first physical unit increases, an overlapping region between the states 701 and 702 may gradually expand. At this time, a determination result of whether a certain memory cell is in the state 701 or the state 702 may gradually become inaccurate. For instance, after applying a read voltage level V(HB) to the first physical unit, the threshold voltage of a memory cell that is presumed to be in the state 701 may be greater than the read voltage level V(HB); hence, the bit stored in this memory cell may be erroneously determined as the bit "0" (i.e., the bit corresponding to the state 702). Alternatively, after applying the read voltage level V(HB) to the first physical unit, the threshold voltage of a memory cell that is presumed to be in the state 702 may be less than the read voltage level V(HB), and therefore the bit stored in this memory cell may be erroneously determined as the bit "1" (i.e., the bit corresponding to the state 701). Under these circumstances, the data read from the first physical unit may contain a large number of error bits, and even the total number of the error bits may exceed the maximum number of error bits that can be corrected in the hard decoding mode. In this case, the memory management circuit 51 and the decoding circuit 541 may be changed to decode the data based on the soft decoding mode.

In the soft decoding mode, the memory management circuit 51 may send a plurality of read command sequences to the rewritable non-volatile memory module 43. The read command sequences may be configured to instruct the rewritable non-volatile memory module 43 to read the first physical unit by using a plurality of read voltage levels V(HB) and V(SB1)-V(SB4) to obtain bits HB and SB1-SB4. For instance, the bit HB is the hard bit, and the bits SB1-SB4 are the soft bits.

Specifically, by sequentially applying the read voltage levels V(HB) and V(SB1)-V(SB4) to the first memory cell, the rewritable non-volatile memory module 43 may sequentially obtain the bits HB and SB1-SB4. The bit HB may reflect a read result of the first memory cell using the read voltage level V(HB). For instance, in response to the threshold voltage of the first memory cell being lower than the read voltage level V(HB), the rewritable non-volatile memory module 43 may obtain the bit HB with a bit value of "1". Alternatively, in response to the threshold voltage of the first memory cell being higher than the read voltage level V(HB), the rewritable non-volatile memory module 43 may obtain the bit HB with a bit value of "0". By the same token, the bits SB1-SB4 may respectively reflect the read result of the first memory cell using read voltage levels V(SB1)-V(SB4).

In an embodiment of the disclosure, the obtained bits HB and SB1-SB4 may reflect that the threshold voltage of the first memory cell is in one of a plurality of voltage ranges defined by the read voltage levels V(HB) and V(SB1)-V(SB4). For instance, assuming the obtained bits HB and SB1-SB4 are "11111", it indicates that the threshold voltage of the first memory cell is less than the read voltage level V(SB3). Alternatively, assuming the obtained bits HB and SB1-SB4 are "11101", it indicates that the threshold voltage of the first memory cell ranges between the read voltage levels V(SB3) and V(SB1), and so on.

In an embodiment of the disclosure, after obtaining the bits SB1-SB4, the rewritable non-volatile memory module 43 may perform a logic operation (also referred to as a first logic operation) on the bits SB1 and SB2 to obtain a bit SB1' (also referred to as a first soft bit). For instance, the first logic operation may include an exclusive OR (XOR) operation, an XNOR operation, or other types of logic operations. For instance, the rewritable non-volatile memory module 43 may perform the XNOR operation on the bits SB1 and SB2 to obtain the bit SB1'. In addition, the rewritable non-volatile memory module 43 may perform a logic operation (also referred to as a second logic operation) on the bits SB3 and SB4 to obtain a bit SB2' (also referred to as a second soft bit). For instance, the second logic operation may also include an XOR operation, an XNOR operation, or other types of logic operations. For instance, the rewritable non-volatile memory module 43 may perform the XNOR operation on the bits SB3 and SB4 to obtain the bit SB2'.

Figure 8:
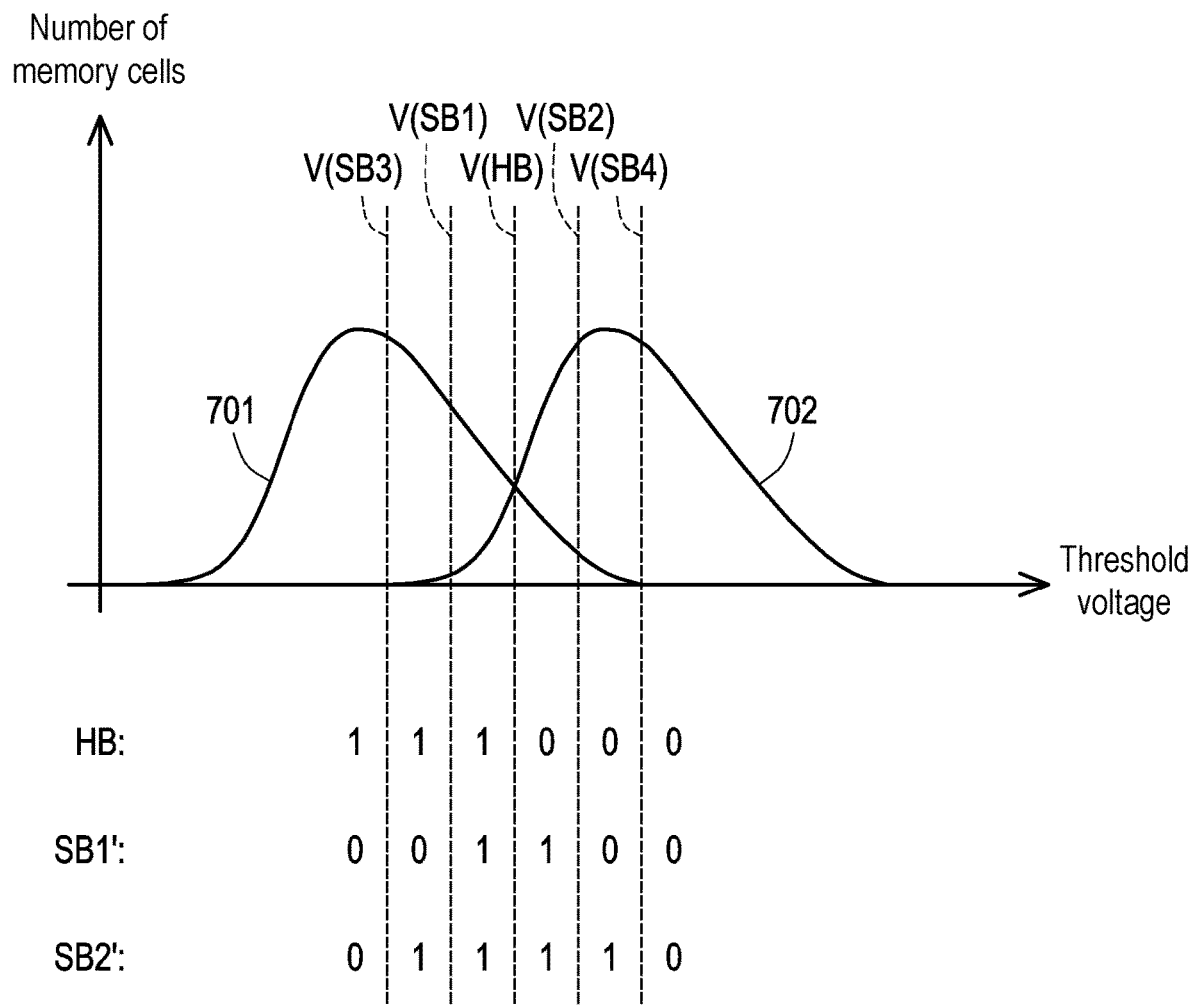
FIG. 8 is a schematic diagram illustrating the threshold voltage distribution of the first physical unit and the use of a plurality of read voltage levels to read the first physical unit according to an exemplary embodiment of the disclosure.

FIG. 8 is a schematic diagram illustrating the threshold voltage distribution of the first physical unit and the use of a plurality of read voltage levels to read the first physical unit according to an exemplary embodiment of the disclosure. With reference to FIG. 8, after the bits SB1' and SB2' are generated, the bits HB, SB1', and SB2' may also reflect that the threshold voltage of the first memory cell is in one of the voltage ranges defined by the read voltage levels V(HB) and V(SB1)-V(SB4). For instance, assuming the obtained bits HB, SB1', and SB2' are "100", it indicates that the threshold voltage of the first memory cell is less than the read voltage level V(SB3). Alternatively, assuming the obtained bits HB, SB1', and SB2' are "101", it indicates that the threshold voltage of the first memory cell ranges between the read voltage levels V(SB3) and V(SB1), and so on.

First Exemplary Embodiment

In an exemplary embodiment, in the soft decoding mode, after sending the read command sequences, the memory management circuit 51 may receive data (also referred to as first data) from the rewritable non-volatile memory module 43. The first data may include replacement data corresponding to a plurality of bits (also referred to as first bits). For instance, the replacement data may include data (also referred to as compressed data) generated by the rewritable non-volatile memory module 43 compressing the first bits. The first bits may reflect the read result of the first memory cell by using the read voltage levels V(SB1)-V(SB4) by the rewritable non-volatile memory module 43. Specifically, the data amount of the first data may be less than the total data amount of the first bits. For instance, the first bits may include the bits SB1' and SB2' in FIG. 8. For instance, the first data may include the replacement data corresponding to the bits SB1' and SB2'. It should be noted that the data compression may further include various data processing means, such as data encoding, data scrambling, data randomization, and other similar means which may be applied to attempt to reduce the data amount of specific data, which will not be elaborated here one by one.

In an exemplary embodiment, after obtaining the bits SB1' and SB2' (i.e., the first bits), the rewritable non-volatile memory module 43 may perform data compression on the bits SB1' and SB2' to generate the first data. However, the rewritable non-volatile memory module 43 may not perform the data compression on the hard bit (e.g., the bit HB) obtained by applying the read voltage level V(HB). Then, the rewritable non-volatile memory module 43 may transmit the first data to the memory management circuit 51. Compared to directly transmitting the first bits (e.g., the bits SB1' and SB2') to the memory management circuit 51, note that transmitting the first data with a reduced data amount to the memory management circuit 51 may effectively reduce the data amount of the data (i.e., the soft bits) read from the rewritable non-volatile memory module 43 in the soft decoding mode.

After receiving the first data from the rewritable non-volatile memory module 43, the memory management circuit 51 may perform data restoration on the first data to obtain a plurality of bits (also referred to as the second bits). For instance, the second bits may include the original first bits (such as the bits SB1' and SB2') restored from the first data by performing data decompression on the first data. Then, the decoding circuit 541 may perform a decoding operation based on the second bits. It should be noted that the data decompression may further include various data processing means corresponding to data compression for restoring the original data, such as data decoding, data descrambling, or data de-randomization, which will not be elaborated here one by one.

Figure 9:
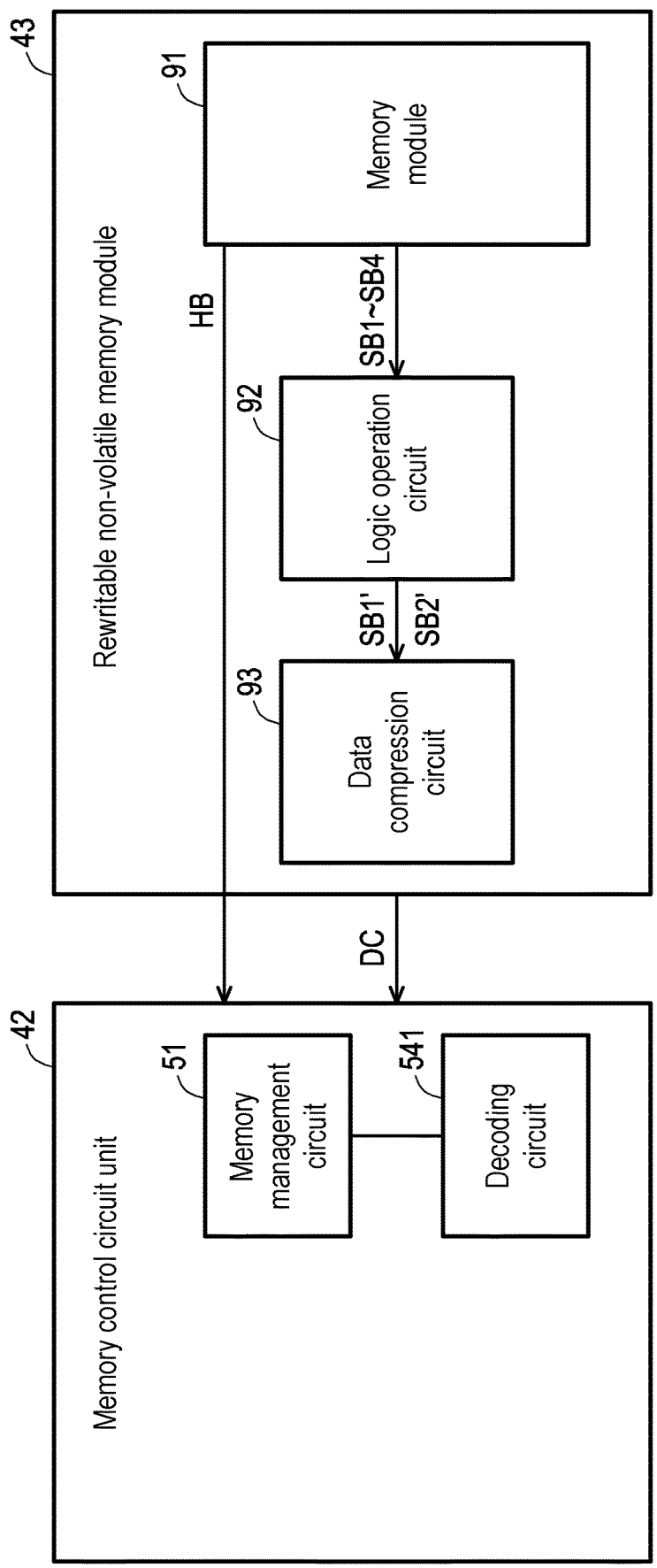
FIG. 9 is a schematic diagram of a memory control circuit unit and a rewritable non-volatile memory module according to an exemplary embodiment of the disclosure.

FIG. 9 is a schematic diagram of a memory control circuit unit and a rewritable non-volatile memory module according to an exemplary embodiment of the disclosure. With reference to FIG. 9, in an exemplary embodiment, the rewritable non-volatile memory module 43 includes a memory module 91, a logic operation circuit 92, and a data compression circuit 93. The logic operation circuit 92 is coupled to the memory module 91 and the data compression circuit 93. The memory module 91 includes a first physical unit.

In an exemplary embodiment, after reading the bits SB1-SB4 corresponding to the first memory cell from the memory module 91, the logic operation circuit 92 may perform a logic operation on the bits SB1-SB4 to generate the bits SB1' and SB2' (i.e., the first bits). Then, the data compression circuit 93 may process the bits SB1' and SB2' (e.g., data compression) to generate data DC (i.e., the first data). For instance, the data DC includes compressed data corresponding to the bits SB1' and SB2'. For instance, the data compression circuit 93 may perform the data compression by applying various compression algorithms, such as run-length compression, Huffman compression, arithmetic compression, or Lempel-Ziv-Markov chain algorithm (LZMA) compression, which should however not be construed as a limitation in the disclosure. The rewritable non-volatile memory module 43 may transmit the bit HB together with the data DC to the memory management circuit 51.

After receiving the data DC from the rewritable non-volatile memory module 43, the memory management circuit 51 may perform data restoration (e.g., decompression) on the data DC to obtain the second bits. For instance, the second bits may include the restored bits SB1' and SB2'. Then, the decoding circuit 541 may perform a decoding operation based on the second bits. For instance, in the decoding operation, the decoding circuit 541 may obtain reliability information based on the second bits (i.e., the bits SB1' and SB2'). For instance, the reliability information may include a log-likelihood ratio (LLR) or other information that may be used to aid in decoding. For instance, the decoding circuit 541 may obtain the corresponding reliability information based on the second bits through looking up a table or real-time calculations, which should however not be construed as a limitation in the disclosure. Then, the decoding circuit 541 may perform the decoding operation based on the reliability information. For instance, the decoding operation may be performed to determine a bit value of the bit HB. For instance, the decoding circuit 541 may determine whether an actual bit value of the bit HB should be "1" or "0" based on the reliability information.

In other words, in the first exemplary embodiment, the soft bits applied in the soft decoding mode are compressed in the rewritable non-volatile memory module 43 and then transmitted to the memory control circuit unit 42. As such, the data amount of the soft bits transmitted by the rewritable non-volatile memory module 43 in the soft decoding mode may be reduced.

Figure 10:
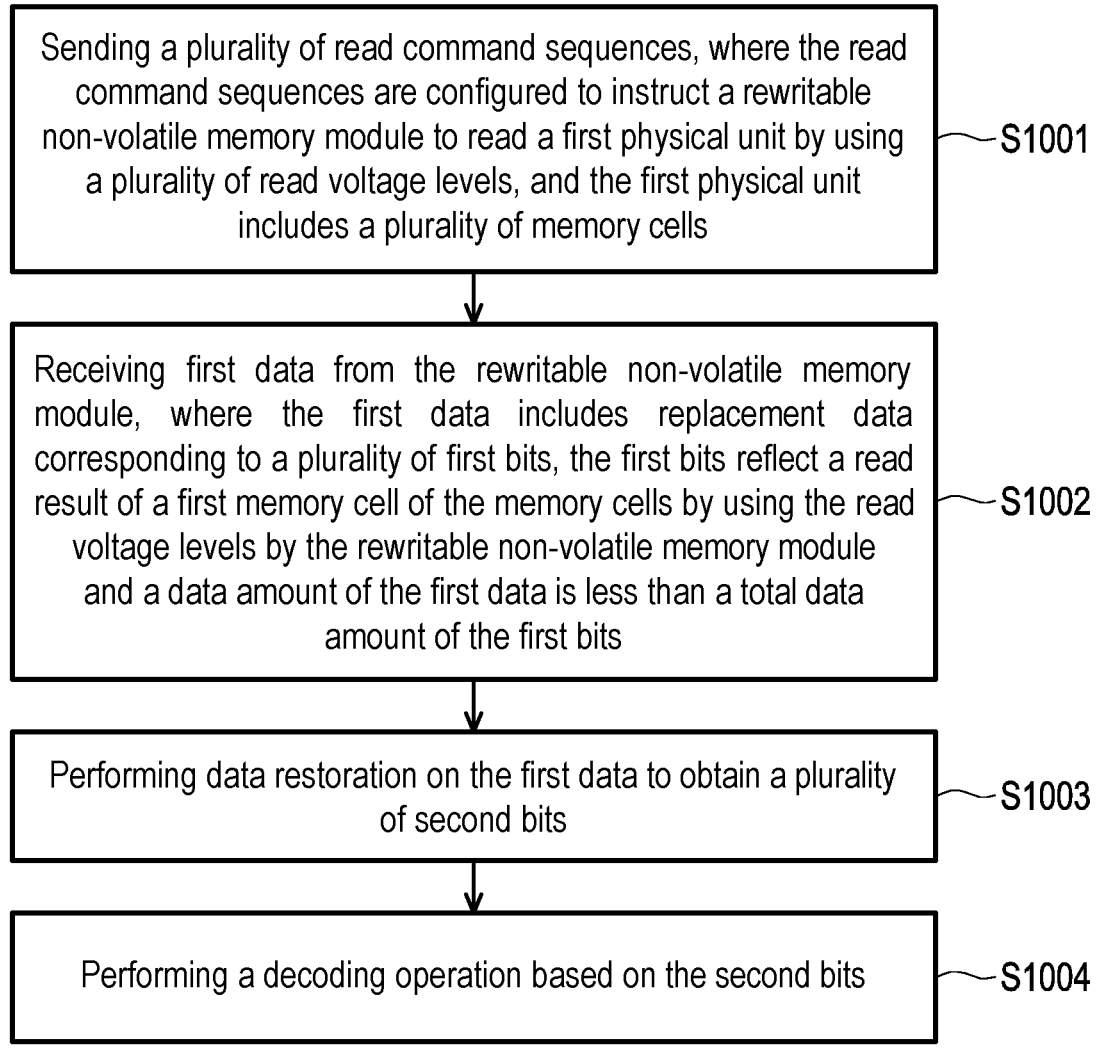
FIG. 10 is a flowchart of a memory control method according to an exemplary embodiment of the disclosure.

FIG. 10 is a flowchart of a memory control method according to an exemplary embodiment of the disclosure. With reference to FIG. 10, in step S1001, a plurality of read command sequences are sent, where the read command sequences are configured to instruct the rewritable non-volatile memory module to read the first physical unit by using a plurality of read voltage levels, and the first physical unit includes a plurality of memory cells. After the read command sequences are sent, in step S1002, first data is received from the rewritable non-volatile memory module, where the first data includes replacement data corresponding to a plurality of first bits, the first bits reflect a read result of a first memory cell of the memory cells by using the read voltage levels by the rewritable non-volatile memory module, and a data amount of the first data is less than a total data amount of the first bits. After the first data is received from the rewritable non-volatile memory module, in step S1003, data restoration is performed on the first data to obtain a plurality of second bits. In step S1004, a decoding operation is performed based on the second bits.

However, the details of each step in FIG. 10 have been elaborated above and thus will not be further described hereinafter. Besides, the steps in FIG. 10 may be implemented in form of a plurality of programming codes or circuits, which should however not be construed as a limitation in the disclosure. In addition, the method depicted in FIG. 10 may be applied in conjunction with the above exemplary embodiments or applied independently, which should also not be construed as a limitation in the disclosure.

Second Exemplary Embodiment

In an exemplary embodiment, in the soft decoding mode, after sending the read command sequences, the memory management circuit 51 may receive a plurality of bits (i.e., the first bits) from the rewritable non-volatile memory module 43. The first bits may reflect the read result of the first memory cell by using the read voltage levels V(SB1)-V(SB4) by the rewritable non-volatile memory module 43. For instance, the first bits may include the bits SB1' and SB2' in FIG. 8.

After receiving the first bits from the rewritable non-volatile memory module 43, the memory management circuit 51 may store the first data in the buffer memory 55. The first data includes replacement data corresponding to the first bits. For instance, the replacement data may include data generated by compressing the first bits by the memory management circuit 51. Specifically, the data amount of the first data may be less than the total data amount of the first bits. For instance, the first data may include compressed data corresponding to bits SB1' and SB2'. As mentioned above, note that the data compression may further include various data processing means, such as data encoding, data scrambling, data randomization, or other data processing means configured to attempt to reduce the data amount of specific data, which will not be elaborated here one by one.

In an exemplary embodiment, after receiving the bits SB1' and SB2' (i.e., the first bits) from the rewritable non-volatile memory module 43, the memory management circuit 51 may compress the bits SB1' and SB2' to generate the first data. However, the memory management circuit 51 may not perform the data compression on the hard bit (e.g., the bit HB) obtained by applying the read voltage level V(HB).

After storing the first data, at a specific time point, the memory management circuit 51 may read the first data from the buffer memory 55 and perform data restoration (e.g., decompression) on the first data to obtain a plurality of bits (i.e., the second bits). Then, the decoding circuit 541 may perform the decoding operation based on the second bits. It should be noted that the data decompression may further include various data processing means corresponding to data compression for restoring the original data, such as data decoding, data descrambling, or data de-randomization, which will not be elaborated here one by one.

Figure 11:
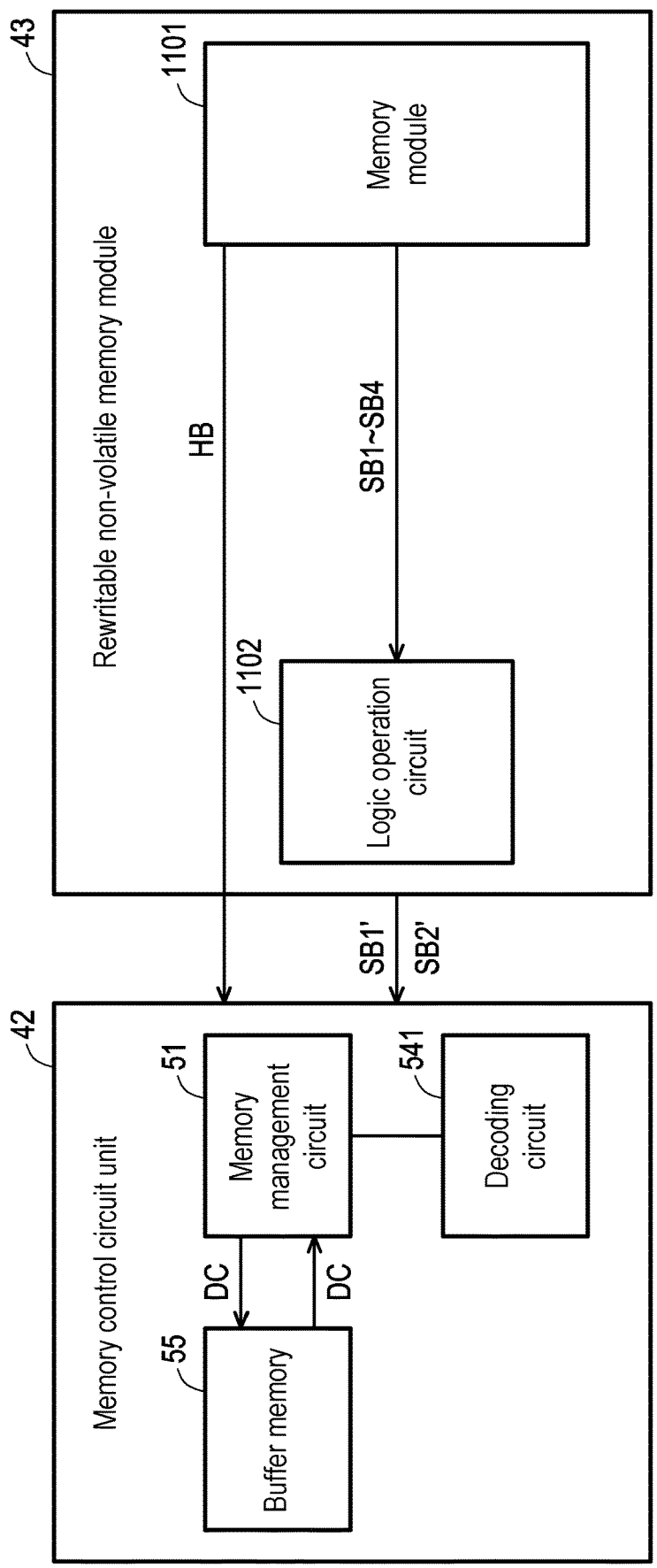
FIG. 11 is a schematic diagram of a memory control circuit unit and a rewritable non-volatile memory module according to an exemplary embodiment of the disclosure.

FIG. 11 is a schematic diagram of a memory control circuit unit and a rewritable non-volatile memory module according to an exemplary embodiment of the disclosure. With reference to FIG. 11, in an exemplary embodiment, the rewritable non-volatile memory module 43 includes a memory module 1101 and a logic operation circuit 1102. The logic operation circuit 1102 is coupled to the memory module 1101. The memory module 1101 includes a first physical unit.

In an exemplary embodiment, after reading the bits SB1-SB4 corresponding to the first memory cell from the memory module 1101, the logic operation circuit 92 may perform a logic operation on the bits SB1-SB4 to generate the bits SB1' and SB2' (i.e., the first bits). Then, the data compression circuit 93 may transmit the bit HB together with the bits SB1' and SB2' to the memory management circuit 51.

After receiving bits SB1' and SB2' from the rewritable non-volatile memory module 43, the memory management circuit 51 may perform data processing (e.g., data compression) on the bits SB1' and SB2' to generate the data DC (i.e., the first data). For instance, the data DC includes compressed data corresponding to the bits SB1' and SB2'. For instance, the memory management circuit 51 may use the above-mentioned various compression algorithms to perform the data compression, which should however not be construed as a limitation in the disclosure. The memory management circuit 51 may store the data DC in the buffer memory 55.

At a specific time point, the memory management circuit 51 may read the data DC from the buffer memory 55 and perform data restoration (e.g., decompression) on the data DC to obtain the second bits. For instance, the second bits may include the restored bits SB1' and SB2'. Then, the decoding circuit 541 may perform the decoding operation based on the second bits. For instance, in the decoding operation, the decoding circuit 541 may obtain reliability information based on the second bits (i.e., the bits SB1' and SB2'). For instance, the reliability information may include LLR or other information that may be used to aid in decoding. Then, the decoding circuit 541 may perform the decoding operation based on the reliability information. Operational details of the decoding operation have been elaborated above and will not be repeated here.

In other words, in the second exemplary embodiment, after the soft bits used in the soft decoding mode are received from the rewritable non-volatile memory module 43, the soft bits are first compressed and then stored in the buffer memory 55. As such, the storage space occupied by the soft bits to be used in the soft decoding mode in the buffer memory 55 may be reduced.

Figure 12:
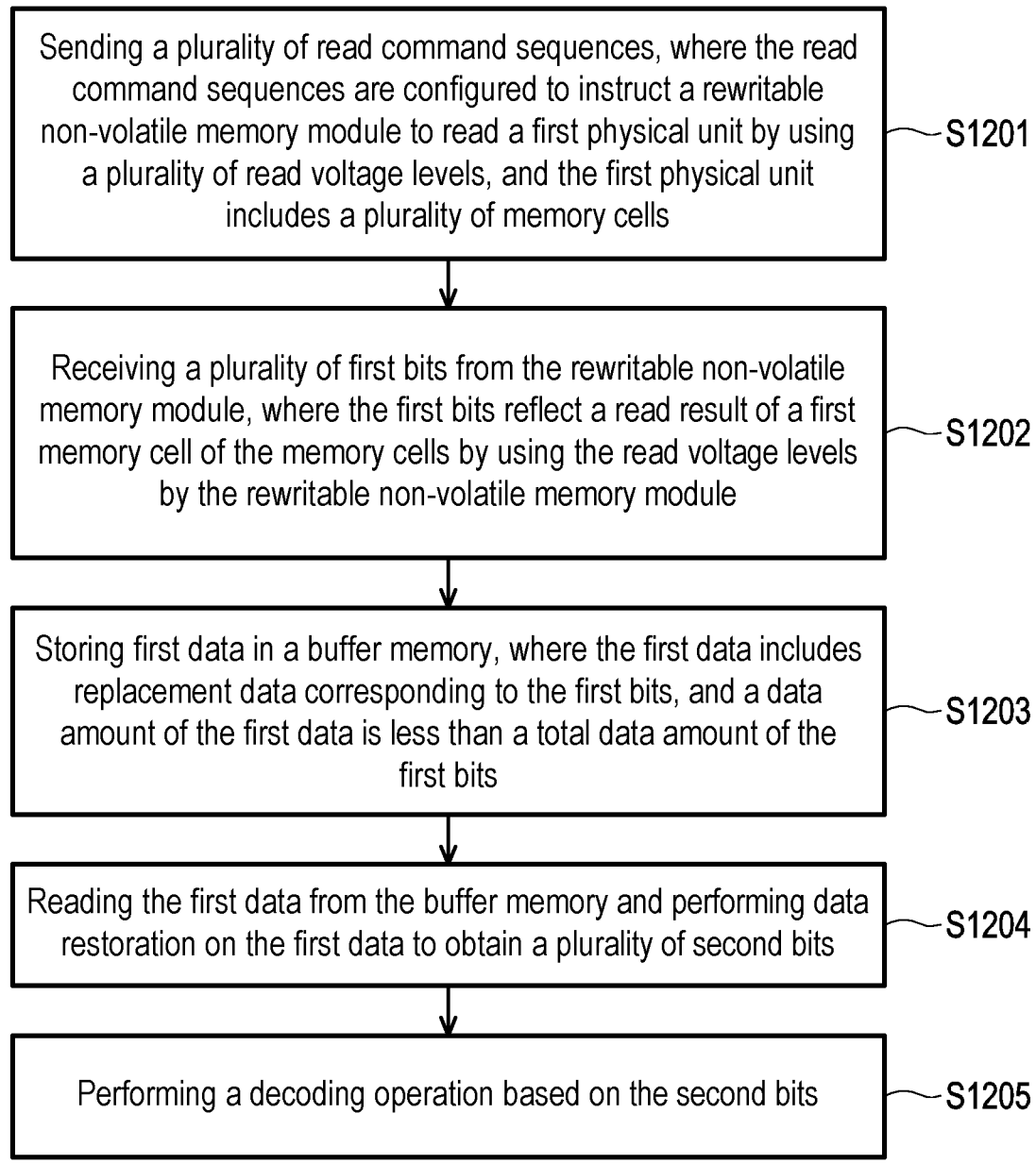
FIG. 12 is a flowchart of a memory control method according to an exemplary embodiment of the disclosure.

FIG. 12 is a flowchart of a memory control method according to an exemplary embodiment of the disclosure.

With reference to FIG. 12, in step S1201, a plurality of read command sequences are sent, where the read command sequences are configured to instruct a rewritable non-volatile memory module to read a first physical unit by using a plurality of read voltage levels, and the first physical unit includes a plurality of memory cells. After the read command sequences are sent, in step S1202, a plurality of first bits are received from the rewritable non-volatile memory module, where the first bits reflect a read result of a first memory cell of the memory cells by using the read voltage levels by the rewritable non-volatile memory module. After the first bits are received from the rewritable non-volatile memory module, in step S1203, first data is stored in a buffer memory, where the first data includes replacement data corresponding to the first bits, and a data amount of the first data is less than a total data amount of the first bits. In step S1204, the first data is read from the buffer memory, and data restoration is performed on the first data to obtain a plurality of second bits. In step S1205, a decoding operation is performed based on the second bits.

Note that the details of each step in FIG. 12 have been elaborated above and thus will not be further described hereinafter. Besides, the steps in FIG. 12 may be implemented in form of a plurality of programming codes or circuits, which should however not be construed as a limitation in the disclosure. In addition, the method depicted in FIG. 12 may be applied in conjunction with the above exemplary embodiments or applied independently, which should also not be construed as a limitation in the disclosure.

To sum up, the memory control method, the memory storage device, and the memory control circuit unit provided in one or more exemplary embodiments of the disclosure are applicable to perform data processing (e.g., data compression) for the soft bits used in the soft decoding mode to reduce the data amount of the soft bits to be transmitted or stored in the soft decoding mode. Thereby, the decoding performance of the soft decoding mode is improved.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A memory control method for a rewritable non-volatile memory module, wherein the rewritable non-volatile memory module comprises a plurality of physical units, and the memory control method comprises:
   sending a plurality of read command sequences, wherein the read command sequences are configured to instruct the rewritable non-volatile memory module to read a first physical unit of the physical units by using a plurality of read voltage levels, and the first physical unit comprises a plurality of memory cells;
   after sending the read command sequences, receiving first data from the rewritable non-volatile memory module, wherein the first data comprises replacement data corresponding to a plurality of first bits, the first bits reflect a read result of a first memory cell of the memory cells, the read result is obtained by using the read voltage levels by the rewritable non-volatile memory module, and a data amount of the first data is less than a total data amount of the first bits;
   after receiving the first data from the rewritable non-volatile memory module, performing data restoration on the first data to obtain a plurality of second bits; and
   performing a decoding operation based on the second bits,
   wherein the read voltage levels are all located within a voltage range covered by two neighboring states of a threshold voltage distribution of the memory cells,
   the first bits comprise a first soft bit and a second soft bit,
   the first soft bit is obtained by performing a first logical operation on a first read result based on a first read voltage level and a second read voltage level among the read voltage levels, and
   the second soft bit is obtained by performing a second logical operation on a second read result based on a third read voltage level and a fourth read voltage level among the read voltage levels.

2. The memory control method according to claim 1, wherein the replacement data comprises data generated by compressing the first bits by the rewritable non-volatile memory module.

3. The memory control method according to claim 1, wherein the first bits reflect that a threshold voltage of the first memory cell is within one of a plurality of voltage ranges defined by the read voltage levels.

4. The memory control method according to claim 1, wherein the first soft bit and the second soft bit reflect that a threshold voltage of the first memory cell is within one of a plurality of voltage ranges defined by the read voltage levels.

5. The memory control method according to claim 1, wherein the step of performing the decoding operation based on the second bits comprises:
   obtaining reliability information based on the second bits; and
   performing the decoding operation based on the reliability information.

6. A memory storage device, comprising:
   a connection interface unit, configured to be coupled to a host system;
   a rewritable non-volatile memory module; and
   a memory control circuit unit, coupled to the connection interface unit and the rewritable non-volatile memory module,
   wherein the rewritable non-volatile memory module comprises a plurality of physical units, and
   the memory control circuit unit is configured to:
   send a plurality of read command sequences, wherein the read command sequences are configured to instruct the rewritable non-volatile memory module to read a first physical unit of the physical units by using a plurality of read voltage levels, and the first physical unit comprises a plurality of memory cells;
   after sending the read command sequences, receive first data from the rewritable non-volatile memory module, wherein the first data comprises replacement data corresponding to a plurality of first bits, the first bits reflect a read result of a first memory cell of the memory cells, the read result is obtained by using the read voltage levels by the rewritable non-volatile memory module, and a data amount of the first data is less than a total data amount of the first bits;
   after receiving the first data from the rewritable non-volatile memory module, perform data restoration on the first data to obtain a plurality of second bits; and
   perform a decoding operation based on the second bits,
   wherein the read voltage levels are all located within a voltage range covered by two neighboring states of a threshold voltage distribution of the memory cells, the first bits comprise a first soft bit and a second soft bit,
the first soft bit is obtained by performing a first logical operation on a first read result based on a first read voltage level and a second read voltage level among the read voltage levels, and
the second soft bit is obtained by performing a second logical operation on a second read result based on a third read voltage level and a fourth read voltage level among the read voltage levels.

7. The memory storage device according to claim 6, wherein the replacement data comprises data generated by compressing the first bits by the rewritable non-volatile memory module.

8. The memory storage device according to claim 6, wherein the first bits reflect that a threshold voltage of the first memory cell is within one of a plurality of voltage ranges defined by the read voltage levels.

9. The memory storage device according to claim 6, wherein the first soft bit and the second soft bit reflect that a threshold voltage of the first memory cell is within one of a plurality of voltage ranges defined by the read voltage levels.

10. The memory storage device according to claim 6, wherein the operation of performing the decoding operation based on the second bits by the memory control circuit unit comprises:
obtaining reliability information based on the second bits; and
performing the decoding operation based on the reliability information.

11. A memory control circuit unit, configured to control a rewritable non-volatile memory module, wherein the rewritable non-volatile memory module comprises a plurality of physical units, and the memory control circuit unit comprises:
a host interface, configured to be coupled to a host system;
a memory interface, configured to be coupled to the rewritable non-volatile memory module;
a decoding circuit; and
a memory management circuit, coupled to the host interface, the memory interface, and the decoding circuit,
wherein the memory management circuit is configured to:
send a plurality of read command sequences, wherein the read command sequences are configured to instruct the rewritable non-volatile memory module to read a first physical unit of the physical units by using a plurality of read voltage levels, and the first physical unit comprises a plurality of memory cells;
after sending the read command sequences, receive first data from the rewritable non-volatile memory module, wherein the first data comprises replacement data corresponding to a plurality of first bits, the first bits reflect a read result of a first memory cell of the memory cells, the read result is obtained by using the read voltage levels by the rewritable non-volatile memory module, and a data amount of the first data is less than a total data amount of the first bits; and
after receiving the first data from the rewritable non-volatile memory module, perform data restoration on the first data to obtain a plurality of second bits, wherein the decoding circuit is configured to perform a decoding operation based on the second bits,
wherein the read voltage levels are all located within a voltage range covered by two neighboring states of a threshold voltage distribution of the memory cells,
the first bits comprise a first soft bit and a second soft bit,
the first soft bit is obtained by performing a first logical operation on a first read result based on a first read voltage level and a second read voltage level among the read voltage levels, and
the second soft bit is obtained by performing a second logical operation on a second read result based on a third read voltage level and a fourth read voltage level among the read voltage levels.

12. The memory control circuit unit according to claim 11, wherein the replacement data comprises data generated by compressing the first bits by the rewritable non-volatile memory module.

13. The memory control circuit unit according to claim 11, wherein the first bits reflect that a threshold voltage of the first memory cell is within one of a plurality of voltage ranges defined by the read voltage levels.

14. The memory control circuit unit according to claim 11, wherein the first soft bit and the second soft bit reflect that a threshold voltage of the first memory cell is within one of a plurality of voltage ranges defined by the read voltage levels.

15. The memory control circuit unit according to claim 11, wherein the operation of performing the decoding operation based on the second bits by the decoding circuit comprises:
obtaining reliability information based on the second bits; and
performing the decoding operation based on the reliability information.

16. A memory control method for a rewritable non-volatile memory module, wherein the rewritable non-volatile memory module comprises a plurality of physical units, and the memory control method comprises:
sending a plurality of read command sequences, wherein the read command sequences are configured to instruct the rewritable non-volatile memory module to read a first physical unit of the physical units by using a plurality of read voltage levels, and the first physical unit comprises a plurality of memory cells;
after sending the read command sequences, receiving a plurality of first bits from the rewritable non-volatile memory module, wherein the first bits reflect a read result of a first memory cell of the memory cells, and the read result is obtained by using the read voltage levels by the rewritable non-volatile memory module;
after receiving the first bits from the rewritable non-volatile memory module, storing first data in a buffer memory, wherein the first data comprises replacement data corresponding to the first bits, and a data amount of the first data is less than a total data amount of the first bits;
reading the first data from the buffer memory and performing data restoration on the first data to obtain a plurality of second bits; and
performing a decoding operation based on the second bits,
wherein the read voltage levels are all located within a voltage range covered by two neighboring states of a threshold voltage distribution of the memory cells,
the first bits comprise a first soft bit and a second soft bit,
the first soft bit is obtained by performing a first logical operation on a first read result based on a first read voltage level and a second read voltage level among the read voltage levels, and
the second soft bit is obtained by performing a second logical operation on a second read result based on a third read voltage level and a fourth read voltage level among the read voltage levels.

17. A memory storage device, comprising:
a connection interface unit, configured to be coupled to a host system;
a rewritable non-volatile memory module; and
a memory control circuit unit, coupled to the connection interface unit and the rewritable non-volatile memory module,
wherein the rewritable non-volatile memory module comprises a plurality of physical units, and
the memory control circuit unit is configured to:
send a plurality of read command sequences, wherein the read command sequences are configured to instruct the rewritable non-volatile memory module to read a first physical unit of the physical units by using a plurality of read voltage levels, and the first physical unit comprises a plurality of memory cells;
after sending the read command sequences, receive a plurality of first bits from the rewritable non-volatile memory module, wherein the first bits reflect a read result of a first memory cell of the memory cells, and the read result is obtained by using the read voltage levels by the rewritable non-volatile memory module;
after receiving the first bits from the rewritable non-volatile memory module, store first data in a buffer memory, wherein the first data comprises replacement data corresponding to the first bits, and a data amount of the first data is less than a total data amount of the first bits;
read the first data from the buffer memory and perform data restoration on the first data to obtain a plurality of second bits; and
perform a decoding operation based on the second bits,
wherein the read voltage levels are all located within a voltage range covered by two neighboring states of a threshold voltage distribution of the memory cells,
the first bits comprise a first soft bit and a second soft bit,
the first soft bit is obtained by performing a first logical operation on a first read result based on a first read voltage level and a second read voltage level among the read voltage levels, and
the second soft bit is obtained by performing a second logical operation on a second read result based on a third read voltage level and a fourth read voltage level among the read voltage levels.

18. A memory control circuit unit, configured to control a rewritable non-volatile memory module, wherein the rewritable non-volatile memory module comprises a plurality of physical units, and the memory control circuit unit comprises:
a host interface, configured to be coupled to a host system;
a memory interface, configured to be coupled to the rewritable non-volatile memory module;
a buffer memory;
a decoding circuit; and
a memory management circuit, coupled to the host interface, the memory interface, the buffer memory, and the decoding circuit,
wherein the memory management circuit is configured to:
send a plurality of read command sequences, wherein the read command sequences are configured to instruct the rewritable non-volatile memory module to read a first physical unit of the physical units by using a plurality of read voltage levels, and the first physical unit comprises a plurality of memory cells;
after sending the read command sequences, receive a plurality of first bits from the rewritable non-volatile memory module, wherein the first bits reflect a read result of a first memory cell of the memory cells, and the read result is obtained by using the read voltage levels by the rewritable non-volatile memory module;
after receiving the first bits from the rewritable non-volatile memory module, store first data in the buffer memory, wherein the first data comprises replacement data corresponding to the first bits, and a data amount of the first data is less than a total data amount of the first bits; and
read the first data from the buffer memory and perform data restoration on the first data to obtain a plurality of second bits, wherein the decoding circuit is configured to perform a decoding operation based on the second bits,
wherein the read voltage levels are all located within a voltage range covered by two neighboring states of a threshold voltage distribution of the memory cells,
the first bits comprise a first soft bit and a second soft bit,
the first soft bit is obtained by performing a first logical operation on a first read result based on a first read voltage level and a second read voltage level among the read voltage levels, and
the second soft bit is obtained by performing a second logical operation on a second read result based on a third read voltage level and a fourth read voltage level among the read voltage levels.

* * * * *